US012326342B2

(12) United States Patent
Nayak et al.

(10) Patent No.: US 12,326,342 B2
(45) Date of Patent: Jun. 10, 2025

(54) METHOD, APPARATUS AND COMPUTER PROGRAM PRODUCT FOR LANE LEVEL TOLL PLAZA CONGESTION MODELING

(71) Applicant: HERE GLOBAL B.V., Eindhoven (NL)

(72) Inventors: Amarnath Nayak, Mumbai (IN); Leon Stenneth, Chicago, IL (US); Advait Raut, Mumbai (IN)

(73) Assignee: HERE GLOBAL B.V., Eindhoven (NL)

( * ) Notice: Subject to any disclaimer, the term of this patent is extended or adjusted under 35 U.S.C. 154(b) by 547 days.

(21) Appl. No.: 17/645,387

(22) Filed: Dec. 21, 2021

(65) Prior Publication Data
US 2023/0194295 A1 Jun. 22, 2023

(51) Int. Cl.
*G01C 21/36* (2006.01)
*G01C 21/34* (2006.01)
*G06F 18/214* (2023.01)
*G06V 20/56* (2022.01)
*G08G 1/01* (2006.01)
*G08G 1/0967* (2006.01)

(52) U.S. Cl.
CPC ..... *G01C 21/3691* (2013.01); *G01C 21/3461* (2013.01); *G08G 1/0112* (2013.01); *G08G 1/096725* (2013.01); *G06F 18/214* (2023.01); *G06V 20/56* (2022.01)

(58) Field of Classification Search
CPC ............ G01C 21/3691; G01C 21/3461; G08G 1/0112; G08G 1/096725; G06V 20/56; G06F 18/214
See application file for complete search history.

(56) References Cited

U.S. PATENT DOCUMENTS

| 8,587,454 | B1* | 11/2013 | Dearworth | ........... | G07B 15/063 |
| | | | | | 340/5.1 |
| 9,672,734 | B1* | 6/2017 | Ratnasingam | ... | G08G 1/096741 |
| 10,323,951 | B2* | 6/2019 | Goyal | ................ | G01C 21/3691 |
| 10,853,671 | B2 | 12/2020 | Mansour et al. | | |

(Continued)

FOREIGN PATENT DOCUMENTS

| CN | 109241938 A | 1/2019 |
| CN | 111341098 B | 6/2020 |
| DE | 102012022629 A1 | 6/2013 |

OTHER PUBLICATIONS

Hosseini et al., "Traffic Prediction Using Time-Space Diagram: A Convolutional Neural Network Approach", Transportation Research Record: Journal of the Transportation Research Board, vol. 2673, Issue 7, (Apr. 18, 2019), 11 pages.

(Continued)

*Primary Examiner* — Luis A Martinez Borrero

(57) ABSTRACT

Embodiments described herein may provide a method for analyzing traffic congestion at a toll plaza and identifying a preferred lane of travel through the toll plaza based on the traffic congestion. Methods may include: determining active toll lanes of all toll lanes at a toll plaza; obtaining probe data for each active toll lane at the toll plaza; determining lane-wise congestion for each active toll lane at the toll plaza; identifying a preferred lane of the active toll lanes; and providing for at least one of a navigational instruction or at least semi-autonomous vehicle control to enter or continue in the preferred lane.

20 Claims, 7 Drawing Sheets

(56) References Cited

U.S. PATENT DOCUMENTS

| | | | |
|---|---|---|---|
| 11,125,570 B2* | 9/2021 | Prabhudeva | G06Q 20/127 |
| 11,256,254 B2* | 2/2022 | Kim | G08G 1/167 |
| 11,400,935 B2* | 8/2022 | Da Silva | B60W 30/18163 |
| 2014/0278052 A1* | 9/2014 | Slavin | G01C 21/3492 |
| | | | 701/400 |
| 2016/0040993 A1* | 2/2016 | Goldberg | G08G 1/0129 |
| | | | 701/533 |
| 2017/0228717 A1* | 8/2017 | Rovik | G06Q 20/085 |
| 2018/0113450 A1* | 4/2018 | Sherony | B60W 30/18163 |
| 2018/0174371 A1* | 6/2018 | Um | G07B 15/06 |
| 2018/0328749 A1* | 11/2018 | Goyal | G01C 21/3617 |
| 2019/0164357 A1* | 5/2019 | John | G06Q 20/28 |
| 2019/0213576 A1* | 7/2019 | Borras | G08G 1/065 |
| 2019/0271550 A1* | 9/2019 | Breed | G01C 21/3811 |
| 2019/0310100 A1* | 10/2019 | Yang | G01C 21/3461 |
| 2019/0311612 A1* | 10/2019 | Johnson | G08G 1/052 |
| 2020/0109955 A1 | 4/2020 | Prabhudeva | |
| 2020/0148221 A1* | 5/2020 | Degawa | B60W 60/001 |
| 2020/0223483 A1* | 7/2020 | Degawa | B60W 50/14 |
| 2021/0035443 A1* | 2/2021 | Young | G08G 1/0145 |
| 2021/0043075 A1* | 2/2021 | Kourous-Harrigan | G08G 1/0145 |
| 2021/0107566 A1* | 4/2021 | Seegmiller | H04W 4/02 |
| 2021/0122374 A1* | 4/2021 | Da Silva | G01C 21/3658 |
| 2021/0197858 A1* | 7/2021 | Zhang | G08G 1/161 |
| 2021/0333113 A1* | 10/2021 | Prabhudeva | G06Q 20/145 |
| 2021/0370978 A1* | 12/2021 | Molinari | G06N 3/04 |
| 2022/0205799 A1* | 6/2022 | Radakovic | G08G 1/096816 |
| 2022/0274624 A1* | 9/2022 | Wray | B60W 60/001 |
| 2022/0276653 A1* | 9/2022 | Wray | G01C 21/3658 |
| 2023/0033672 A1* | 2/2023 | Nayak | G08G 1/0175 |
| 2023/0154319 A1* | 5/2023 | Stenneth | G05D 1/617 |
| | | | 701/26 |
| 2023/0154332 A1* | 5/2023 | Nayak | G08G 1/096716 |
| | | | 701/301 |

OTHER PUBLICATIONS

Neuhold et al., "Predicting and Optimizing Traffic Flow at Toll Plazas", 21st EURO Working Group on Transportation Meeting, EWGT 2018, (Sep. 17-19, 2018), 8 pages.

Yu et al., "Toll Plaza Lane Choice and Lane Configuration Strategy for Autonomous Vehicles in Mixed Traffic", Journal of Transportation Engineering, Part A: Systems, vol. 146, Issue 12, (Dec. 2020), 11 pages.

* cited by examiner

METHOD, APPARATUS AND COMPUTER PROGRAM PRODUCT FOR LANE LEVEL TOLL PLAZA CONGESTION MODELING

TECHNOLOGICAL FIELD

An example embodiment of the present invention relates generally to determining lane-level toll plaza congestion, and more particularly, to a method, apparatus and computer program product for analyzing traffic congestion at a toll plaza and identifying a preferred lane of travel through the toll plaza based on the traffic congestion.

BACKGROUND

The advent of digital maps that include up-to-date dynamic data regarding conditions affecting travel within a geographic region has transformed the way in which people travel. Routing algorithms can determine the most efficient path from an origin to a destination at a given time and guide a user along the established route. Further, traffic information can be updated as a user travels along the route and can be provided to the user as needed. Beyond traffic data, weather data can be provided for geographic regions that can affect travel where the weather data can be used by a person to make informed decisions about where they are traveling. These technological developments have improved the efficiency with which people travel and can provide people with a reasonable estimate of their time of arrival at a destination.

While traffic along road segments can be relatively well defined based on feedback from probe data traveling along a road segment, vehicle behavior changes around toll plazas, border crossings, and weigh stations. These road network features can be difficult to model and difficult to efficiently traverse even with an understanding of general road traffic.

BRIEF SUMMARY

A method, apparatus, and computer program product are therefore provided for determining lane-level toll plaza congestion, and more particularly, to a method, apparatus and computer program product for analyzing traffic congestion at a toll plaza and identifying a preferred lane of travel through the toll plaza based on the traffic congestion. Embodiments include an apparatus including at least one processor and at least one non-transitory memory including computer program code instructions, the computer program code instructions may be configured to, when executed, cause the apparatus to at least: determine active toll lanes of all toll lanes at a toll plaza; obtain probe data for each active toll lane at the toll plaza; determine lane-wise congestion for each active toll lane at the toll plaza; identify a preferred lane of the active toll lanes; and provide for at least one of a navigational instruction or at least semi-autonomous vehicle control to enter or continue in the preferred lane.

According to some embodiments, the preferred lane includes a lane that is both an accessible lane and a lane that has relatively lower congestion than other lanes of the active toll lanes. An accessible lane of certain embodiments includes a lane that can be safely reached from a current lane of a vehicle based on a distance of the accessible lane from the current lane and a distance between a current location of the vehicle and a toll booth of the toll plaza. Causing the apparatus of certain embodiments to determine lane-wise congestion for each active toll lane at the toll plaza includes causing the apparatus to: plot a Time Space Diagram (TSD) for each active toll lane; and determine lane-wise congestion for each active toll lane based on the TSD.

According to some embodiments, causing the apparatus to identify a preferred lane of the active toll lanes includes causing the apparatus to: process the TSD for each active toll lane through a convolutional neural network; and obtain, from the convolutional neural network, an indication of an active toll lane with the lowest level of congestion. Causing the apparatus of some embodiments to identify a preferred lane of the active toll lanes includes causing the apparatus to: process the TSD for each active toll lane through a convolutional neural network; and obtain, from the convolutional neural network, a ranking of the active toll lanes based on a degree of congestion in each active toll lane. Causing the apparatus of some embodiments to identify a preferred lane of the active toll lanes includes causing the apparatus to identify the preferred lane based on a lowest degree of congestion of active toll lanes accessible from a current lane of travel of a vehicle. According to certain embodiments, a lane is determined to be accessible from a current lane of travel based on a distance of the active toll lane from the current lane of travel and a distance between a current location of the vehicle and a toll booth of the toll plaza. The apparatus of certain embodiments is further caused to identify restrictions for each of the active toll lanes, and identify a preferred lane of the active toll lanes based, at least in part, on restrictions of the preferred lane.

Embodiments provided herein include a computer program product including at least one non-transitory computer-readable storage medium having computer-executable program code instructions stored therein, the computer-executable program code instructions including program code instructions to: determine active toll lanes of all toll lanes at a toll plaza; obtain probe data for each active toll lane at the toll plaza; determine lane-wise congestion for each active toll lane at the toll plaza; identify a preferred lane of the active toll lanes; and provide for at least one of a navigational instruction or at least semi-autonomous vehicle control to enter or continue in the preferred lane.

According to some embodiments, the preferred lane includes a lane that is both an accessible lane and a lane that has relatively lower congestion than other lanes of the active toll lanes. An accessible lane of certain embodiments includes a lane that can be safely reached from a current lane of a vehicle based on a distance of the accessible lane from the current lane and a distance between a current location of the vehicle and a toll booth of the toll plaza. The program code instructions to determine lane-wise congestion for each active toll lane at the toll plaza include, in some embodiments, program code instructions to: plot a Time Space Diagram (TSD) for each active toll lane; and determine lane-wise congestion for each active toll lane based on the TSD.

According to some embodiments, the program code instructions to identify a preferred lane of the active toll lanes include program code instructions to: process the TSD for each active toll lane through a convolutional neural network; and obtain, from the convolutional neural network, an indication of an active toll lane with the lowest level of congestion. The program code instructions to identify a preferred lane of the active toll lanes include, in some embodiments, program code instructions to: process the TSD for each active toll lane through a convolutional neural network; and obtain, from the convolutional neural network, a ranking of the active toll lanes based on a degree of congestion in each active toll lane. The program code instructions of some embodiments to identify a preferred lane of the active toll lanes include program code instructions to identify the preferred lane based on a lowest degree of congestion of active toll lanes accessible from a current lane of travel of a vehicle. According to certain embodiments, a lane is determined to be accessible from a current lane of travel based on a distance of the active toll lane from the current lane of travel and a distance between a current location of the vehicle and a toll booth of the toll plaza. The computer program product of certain embodiments further includes program code instructions to identify restrictions for each of the active toll lanes, and identify a preferred lane of the active toll lanes based, at least in part, on restrictions of the preferred lane.

Embodiments provided herein include a method including: determining active toll lanes of all toll lanes at a toll plaza; obtaining probe data for each active toll lane at the toll plaza; determining lane-wise congestion for each active toll lane at the toll plaza; identifying a preferred lane of the active toll lanes; and providing for at least one of a navigational instruction or at least semi-autonomous vehicle control to enter or continue in the preferred lane.

According to some embodiments, the preferred lane includes a lane that is both an accessible lane and a lane that has relatively lower congestion than other lanes of the active toll lanes. An accessible lane of certain embodiments includes a lane that can be safely reached from a current lane of a vehicle based on a distance of the accessible lane from the current lane and a distance between a current location of the vehicle and a toll booth of the toll plaza. According to some embodiments, determining lane-wise congestion for each active toll lane at the toll plaza includes: plotting a Time Space Diagram (TSD) for each active toll lane; and determining lane-wise congestion for each active toll lane based on the TSD.

According to some embodiments, identifying a preferred lane of the active toll lanes includes: processing the TSD for each active toll lane through a convolutional neural network; and obtaining, from the convolutional neural network, an indication of an active toll lane with the lowest level of congestion. Identifying a preferred lane of the active toll lanes includes, in certain embodiments: processing the TSD for each active toll lane through a convolutional neural network; and obtaining, from the convolutional neural network, a ranking of the active toll lanes based on a degree of congestion in each active toll lane. According to some embodiments, identifying a preferred lane of the active toll lanes includes identifying the preferred lane based on a lowest degree of congestion of active toll lanes accessible from a current lane of travel of a vehicle. According to certain embodiments, a lane is determined to be accessible from a current lane of travel based on a distance of the active toll lane from the current lane of travel and a distance between a current location of the vehicle and a toll booth of the toll plaza. The method of certain embodiments further includes identifying restrictions for each of the active toll lanes, and identifying a preferred lane of the active toll lanes based, at least in part, on restrictions of the preferred lane.

Embodiments provided herein include an apparatus including: means for determining active toll lanes of all toll lanes at a toll plaza; means for obtaining probe data for each active toll lane at the toll plaza; means for determining lane-wise congestion for each active toll lane at the toll plaza; means for identifying a preferred lane of the active toll lanes; and means for providing for at least one of a navigational instruction or at least semi-autonomous vehicle control to enter or continue in the preferred lane.

According to some embodiments, the preferred lane includes a lane that is both an accessible lane and a lane that has relatively lower congestion than other lanes of the active toll lanes. An accessible lane of certain embodiments includes a lane that can be safely reached from a current lane of a vehicle based on a distance of the accessible lane from the current lane and a distance between a current location of the vehicle and a toll booth of the toll plaza. According to some embodiments, the means for determining lane-wise congestion for each active toll lane at the toll plaza includes: means for plotting a Time Space Diagram (TSD) for each active toll lane; and means for determining lane-wise congestion for each active toll lane based on the TSD.

According to some embodiments, the means for identifying a preferred lane of the active toll lanes includes: means for processing the TSD for each active toll lane through a convolutional neural network; and means for obtaining, from the convolutional neural network, an indication of an active toll lane with the lowest level of congestion. The means for identifying a preferred lane of the active toll lanes includes, in certain embodiments: means for processing the TSD for each active toll lane through a convolutional neural network; and means for obtaining, from the convolutional neural network, a ranking of the active toll lanes based on a degree of congestion in each active toll lane. According to some embodiments, the means for identifying a preferred lane of the active toll lanes includes means for identifying the preferred lane based on a lowest degree of congestion of active toll lanes accessible from a current lane of travel of a vehicle. According to certain embodiments, a lane is determined to be accessible from a current lane of travel based on a distance of the active toll lane from the current lane of travel and a distance between a current location of the vehicle and a toll booth of the toll plaza. The apparatus of certain embodiments further includes means for identifying restrictions for each of the active toll lanes, and means for identifying a preferred lane of the active toll lanes based, at least in part, on restrictions of the preferred lane.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
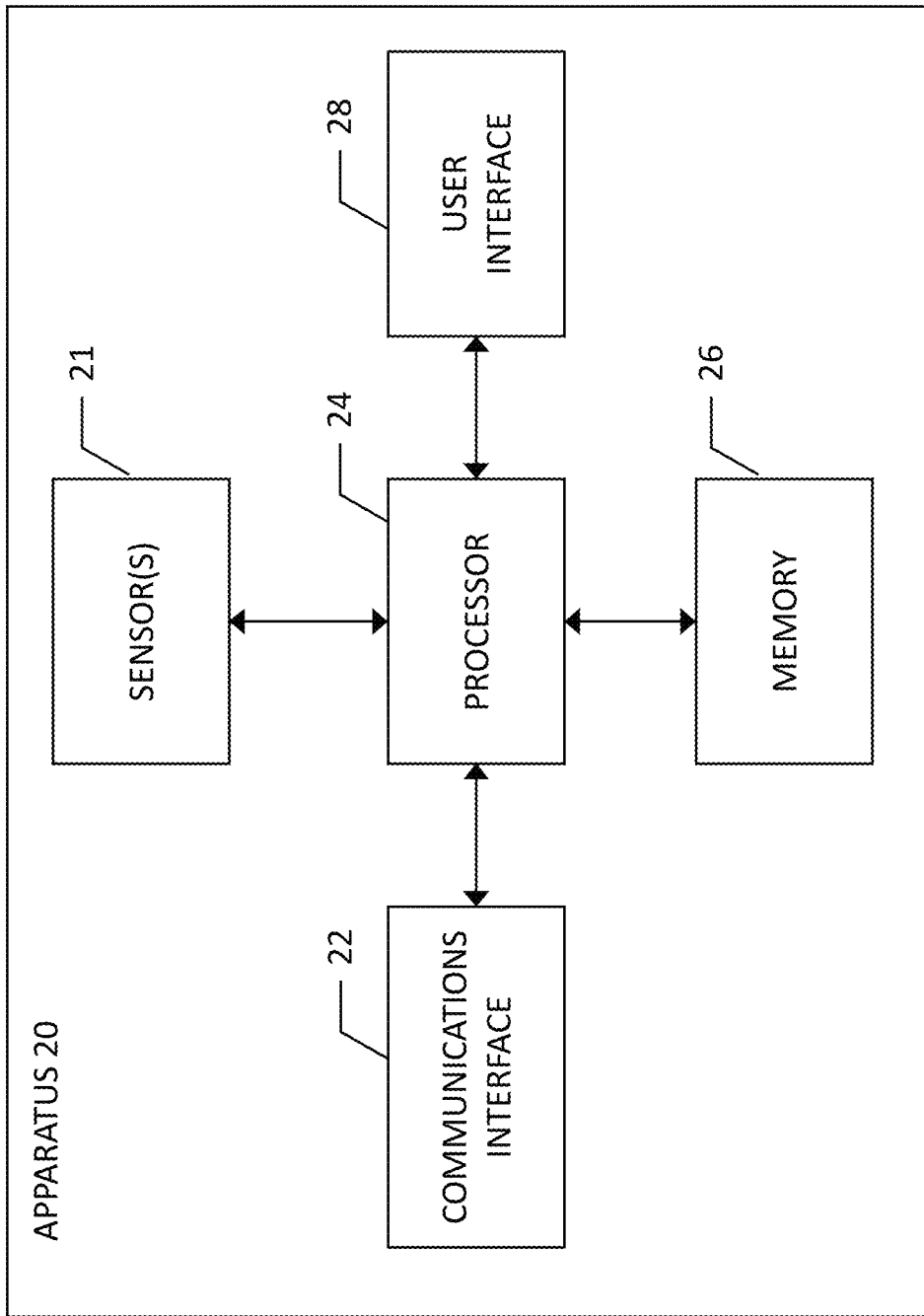
Figure 2:
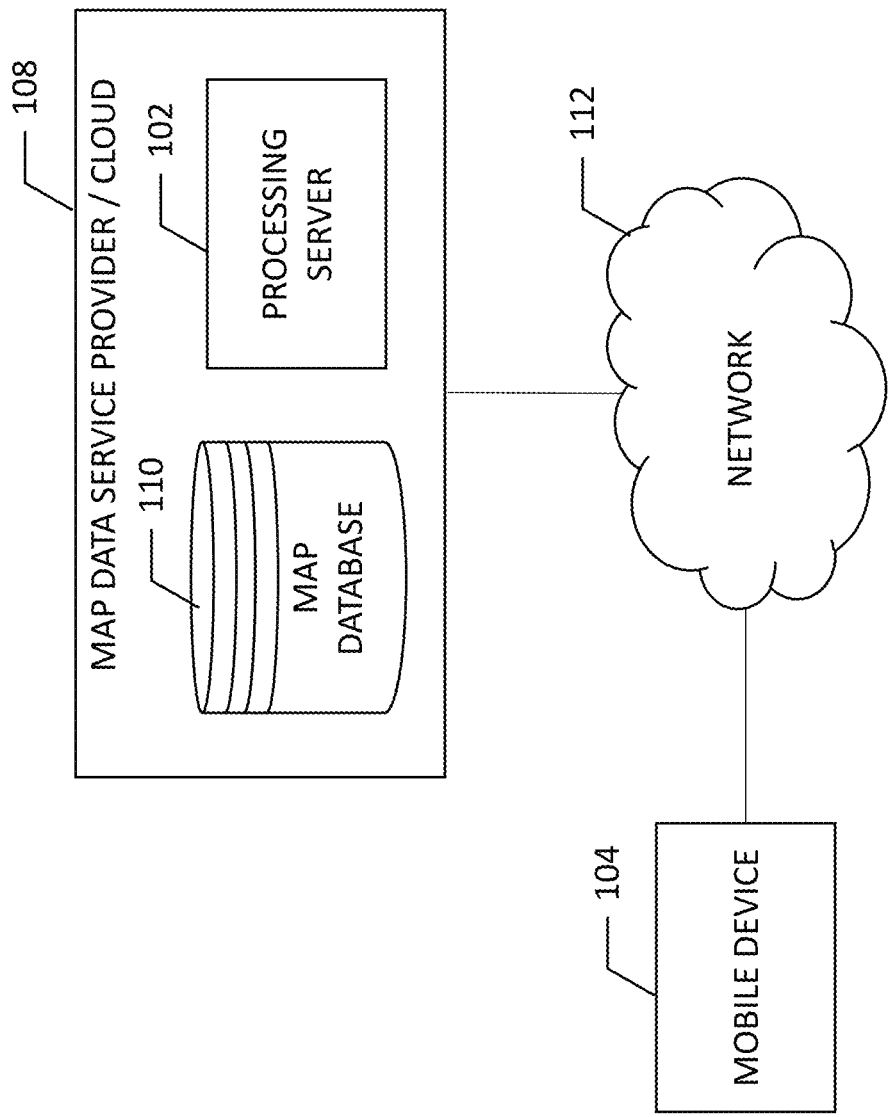
Figure 3:
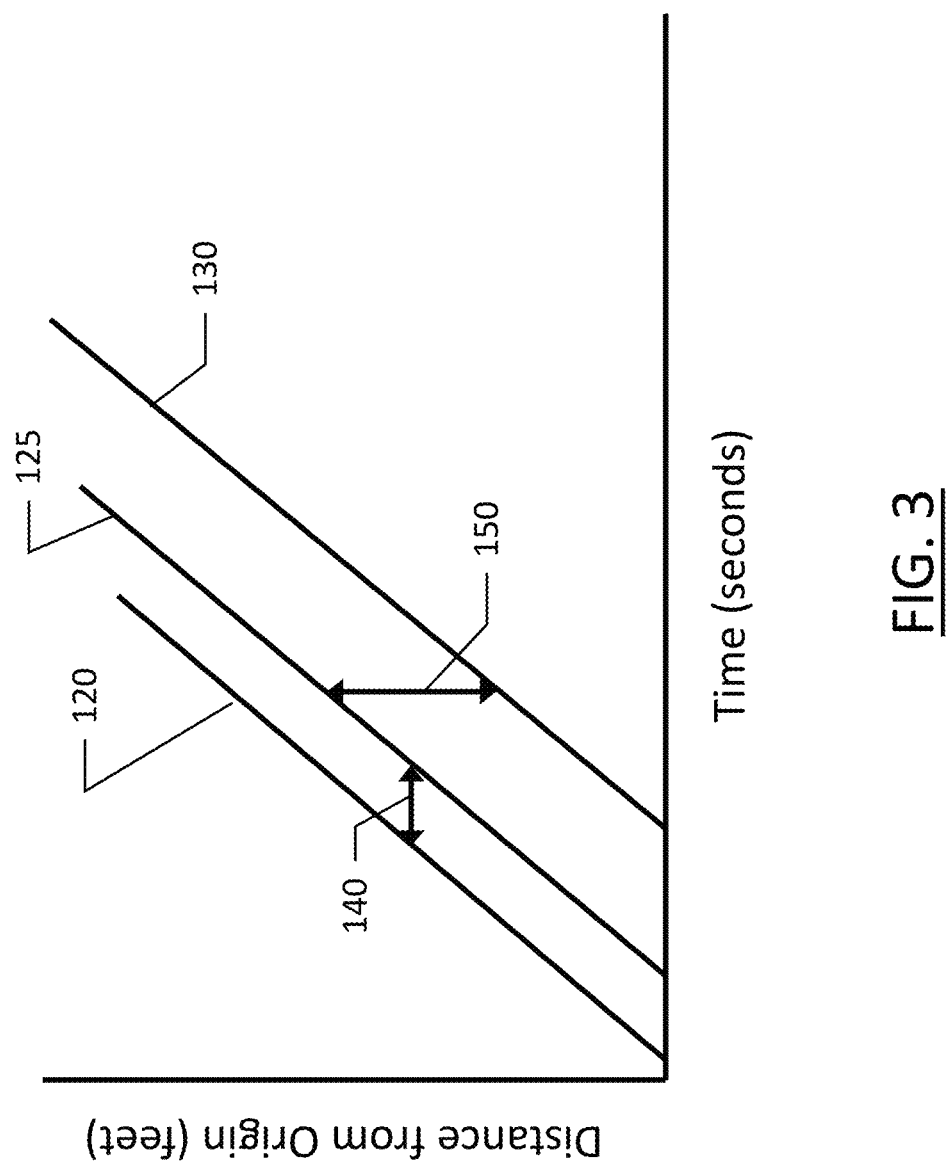
Figure 4:
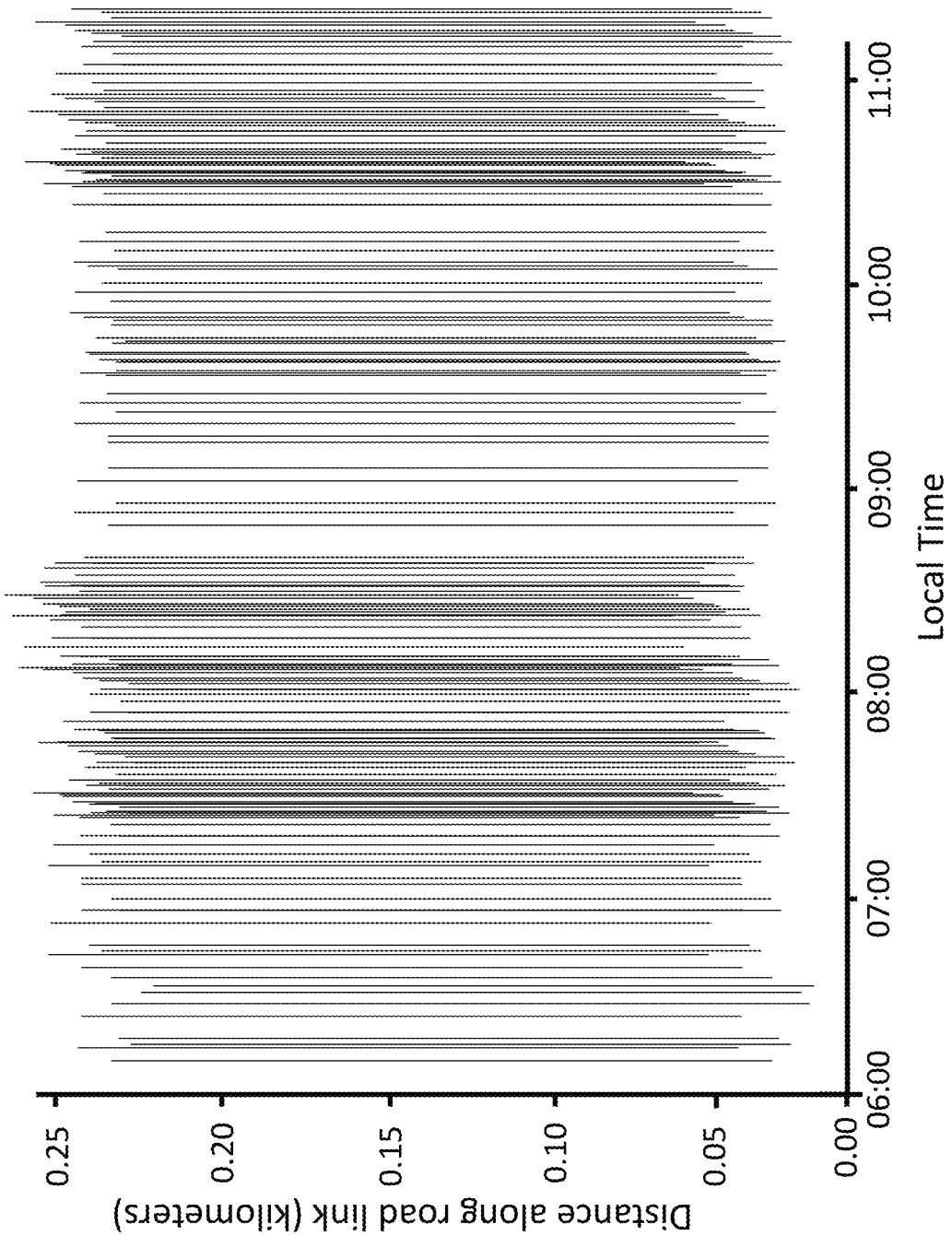
Figure 5:
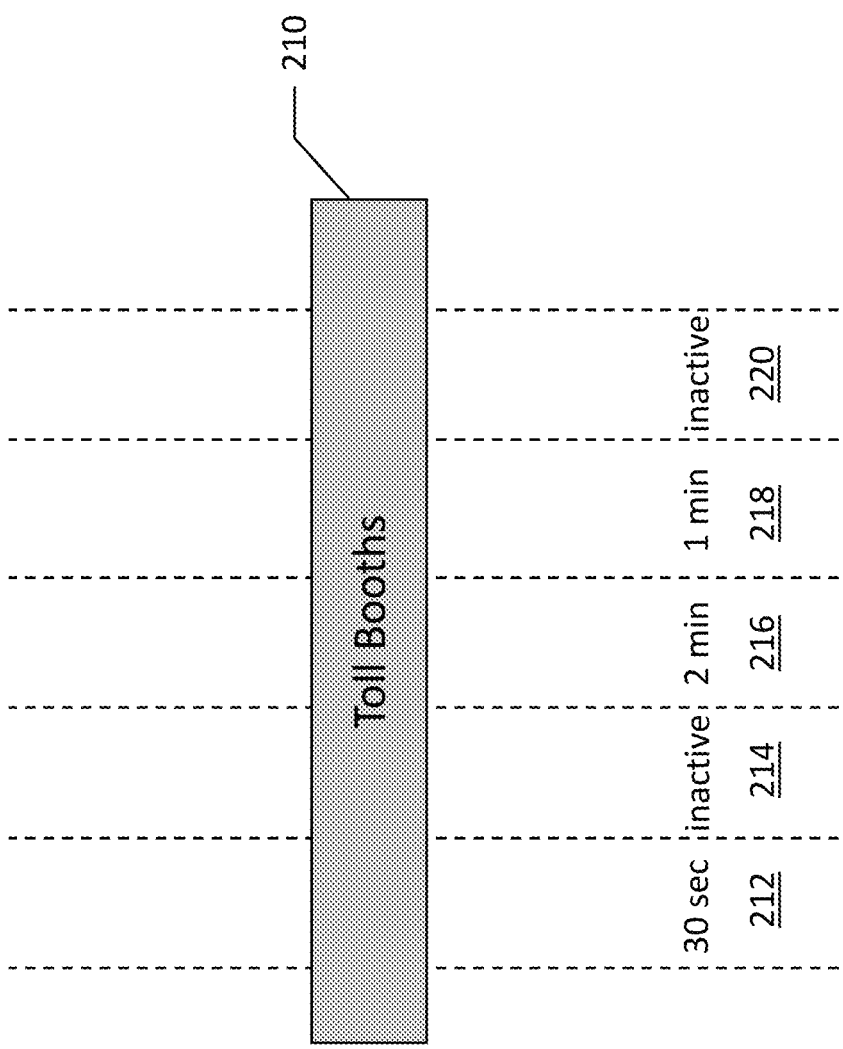
Figure 6:
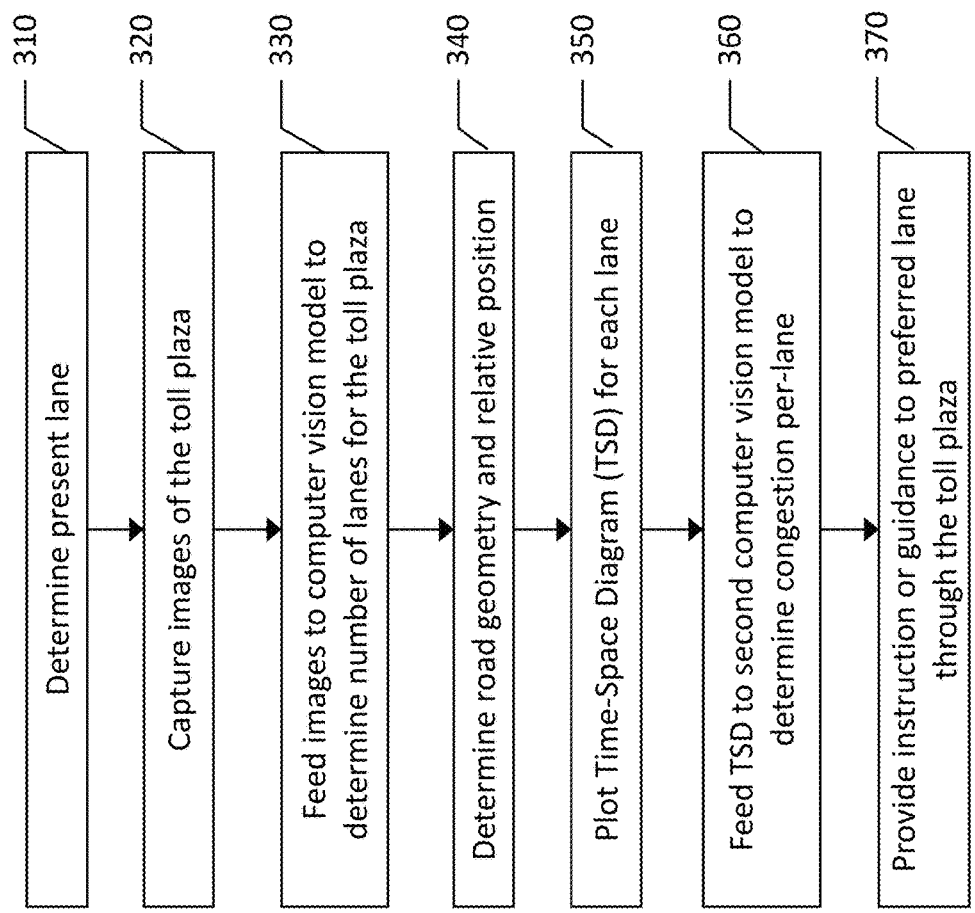
Figure 7:
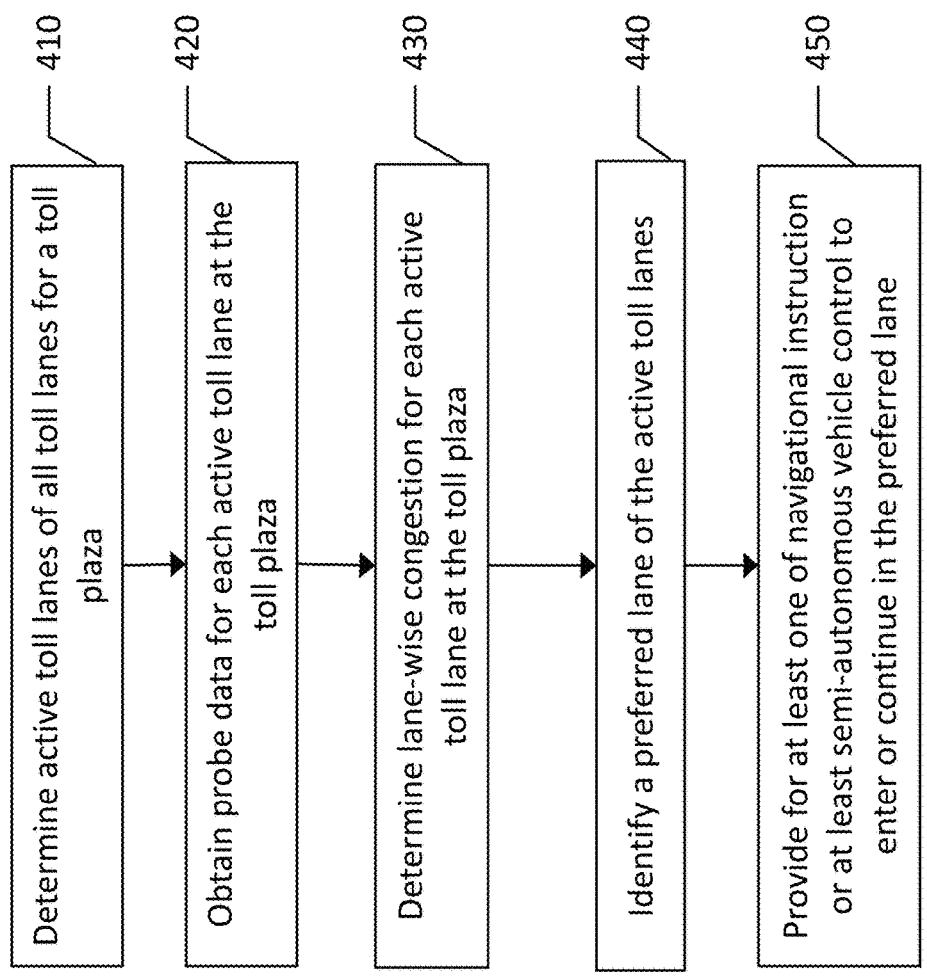

Having thus described certain example embodiments of the present disclosure in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for determining lane-level toll plaza congestion according to an example embodiment of the present disclosure;

FIG. 3 illustrates a time-space diagram for several vehicles along a road segment according to an example embodiment of the present disclosure;

FIG. 4 illustrates another time-space diagram according to an example embodiment of the present disclosure;

FIG. 5 depicts a toll plaza including a plurality of toll lanes and toll booths according to an example embodiment of the present disclosure;

FIG. 6 is a flowchart of a method for determining lane-level toll plaza congestion according to an example embodiment of the present disclosure; and FIG. 7 is a flowchart of another method for determining lane-level toll plaza congestion according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present disclosure for determining lane-level toll plaza congestion, and more particularly, to a method, apparatus and computer program product for analyzing traffic congestion at a toll plaza and identifying a preferred lane of travel through the toll plaza based on the traffic congestion. Autonomous vehicle control and navigational assistance along a network of roads is facilitated by an understanding of traffic patterns and traffic volumes along road segments and through intersections. However, certain road network features are difficult to model and predict with regard to how they may be efficiently traversed. One such example is a toll plaza. While example embodiments describe herein a toll plaza, other similar road network features include border crossings and weigh stations, both of which have traffic patterns and traffic challenges similar to those of toll plazas. As such, while an example embodiment described herein refers to a toll plaza, embodiments of the present disclosure can be implemented with respect to border crossings and weigh stations.

One of the challenges associated with traversing a toll plaza is that the number of active toll lanes and the number of restricted travel lanes may change and be dynamic over time. Active toll lanes as described herein are toll lanes that are actively allowing traffic flow through them with the collection of tolls. Restricted travel lanes or restricted toll lanes include lanes of a toll plaza that include certain restrictions. These restrictions can include lanes that do not allow trucks or buses, lanes that only allow electronic toll passes, lanes that allow only card payment, and lanes that allow cash payment. These restrictions can be multiplexed, where a single toll lane may allow multiple types of payment, but does not allow at least one form of payment. Restrictions can also be dynamic, where restrictions on a toll lane change over time. For example, a toll lane that accepts cash and credit card at one time, may change to credit card only when staff is unavailable to accept cash. Thus, restrictions are dynamic as our whether toll lanes are active or not.

As used herein, active restricted toll lanes are toll lanes processing vehicles through with at least one restriction, while active unrestricted toll lanes process vehicles without restriction to vehicle type or payment type. Toll lanes encompass all toll lanes (active/inactive, restricted/unrestricted) while active toll lanes encompass all active toll lanes (restricted/unrestricted).

As toll lanes may be active or inactive, and may or may not have restrictions, and as these factors can be dynamically changed, navigational assistance and autonomous or semi-autonomous vehicle control approaching a toll plaza is challenging. Embodiments described herein provide a manner in which toll lanes are analyzed as a toll plaza is approached to determine lane restrictions and which lanes are active toll lanes to identify a preferred toll lane through the toll plaza that is most efficient for travel. A preferred toll lane is an active toll lane that is identified to have a relatively lower level of traffic congestion through the toll plaza. Toll lanes may be accessible or inaccessible to a vehicle traveling through the toll plaza. Accessible lanes include lanes that a vehicle can safely reach through one or more lane changes with sufficient distance before reaching the toll plaza. Lanes may be inaccessible due to physical barriers, due to too many lanes between a current lane of travel and a lane deemed inaccessible, due to traffic volumes in surrounding lanes, or a combination thereof. Further, the number of accessible lanes may be reduced as a toll plaza is approached as there is less time/distance in which to change lanes. Thus, accessible lanes are determined based on a combination of factors.

Due to the myriad of factors that influence vehicle and traffic behavior at a toll plaza, conventional routing algorithms are not adapted to provide an efficient path through the toll plaza. Vehicles slow down as they approach toll plazas, choose a lane, and move to that lane in ways that are often unpredictable. The road approaching a toll plaza becomes wider and lanes are added, often multiple lanes are added in a relatively short distance span. Road markings change to define the additional lanes. Signage (both static and dynamic) appears defining restrictions on toll lanes and identifies which toll lanes are active. Traffic congestion increases and speeds decrease. Because of these issues, autonomous vehicle control and navigational guidance is generally ill equipped to handle such scenarios. Further, exiting a toll booth at a toll plaza also involves the merging of lanes with little warning and with little room relative to most lane merges, and in some cases, lanes split shortly after toll booths for different directions of travel. These additional factors render toll plazas difficult to traverse by autonomous or semi-autonomous vehicle control.

Embodiments described herein provide for at least semi-autonomous vehicle control and/or navigational assistance in determining lane-wise congestion at a toll plaza to guide a vehicle along a path through the toll plaza maximizing efficiency while minimizing the congestion encountered by the vehicle. Embodiments enable a vehicle to pre-determine a lane with a relatively lower level of congestion before the toll plaza is reached. Lane-wise congestion at a toll plaza is carried out in certain embodiments described herein using Time Space Diagram (TSD), described further below.

In example embodiments, a navigation system user interface may be provided for driver assistance for a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Autonomous vehicle control is defined by six levels of vehicle autonomy established by the Society of Automotive Engineers (SAE). Level zero is a fully-manual vehicle driven by a person with no systems that guide the vehicle. Level five is a fully autonomous vehicle where the vehicle performs all driving tasks under all conditions, where there is zero human attention or interaction involved. Embodiments described herein can be employed in any of these levels of autonomy as with level zero, navigational assistance can be provided by a device that a user interprets and drives a vehicle with the aid of the navigational information. For level five or any level of at least some autonomy, embodiments can provide guidance or physically guide a vehicle along a path through a toll plaza based on embodiments described herein. For manually driven vehicles, embodiments provide navigational assistance to indicate to a driver a preferred path through a toll plaza.

FIG. 1 is a schematic diagram of an example apparatus configured for performing any of the operations described herein. Apparatus 20 is an example embodiment that may be embodied by or associated with any of a variety of computing devices that include or are otherwise associated with a device configured to provide navigational guidance or at least semi-autonomous vehicle control through a toll plaza. For example, the computing device may be an advanced driver assistance system (ADAS), a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), Light Distancing and Ranging (LiDAR) sensor, humidity sensor, image capture sensor, precipitation sensor, accelerometer, and/or gyroscope. Any of the sensors may be used to sense information regarding the movement, positioning, or orientation of the device and for determining a weather condition at the location of the device as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 26, and/or the like). In this regard, the apparatus 20 may interpret sensed data as certain weather conditions and establish location based on other sensor data, such as GPS data, for providing weather condition information for a specific location, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

According to certain embodiments, the apparatus 20 may support a mapping or navigation application so as to present maps or otherwise provide navigation or driver assistance. In order to support a mapping application, the computing device may include or otherwise be in communication with a geographic database, such as may be stored in memory device 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LIDAR, ultrasonic and/or infrared sensors.

In example embodiments, a user device user interface and/or navigation system user interface may be provided to provide information or driver assistance to a user traveling along a network of roadways. According to example embodiments, map service provider database may be used to provide driver assistance via a navigation system and/or through at least semi-autonomous vehicle control. FIG. 2 illustrates a communication diagram of an example embodiment of a system for implementing example embodiments described herein using a navigation system and a map data service provider. The illustrated embodiment of FIG. 2 includes a mobile device 104, which may be, for example, the apparatus 20 of FIG. 1, such as a mobile phone, an in-vehicle navigation system, an advanced driver assistance system (ADAS), or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data or location-based hazard warning data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region. These vehicles or probes may be embodied by mobile device 104 and may provide data to the map data service provider in the form of traffic speed/congestion data, weather information, location, speed, direction, etc.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments. An embodiment implemented as an ADAS may at least partially control autonomous or semi-autonomous features of a vehicle with the assistance of establishing the vehicle.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through. According to example embodiments described herein, this includes representations of toll plazas and providing efficient navigation there through given the dynamic nature of toll lanes and traffic flowing through a toll plaza, as described above.

Embodiments described herein determine lane-wise congestion at a toll plaza such that navigational guidance or at least semi-autonomous control can be used to guide a vehicle along the most efficient path available through the toll plaza. Embodiments can pre-determine the lane with the minimum or at least relatively low congestion before a vehicle approaches the toll plaza. The lane-wise congestion detection of an example embodiment is carried out using a Time Space Diagram (TSD). A time-space diagram of example embodiments includes time on the horizontal axis with distance from a reference point on the vertical axis. Trajectories of individual vehicles in motion may be portrayed in such a diagram by sloping lines, while stationary vehicles are represented by horizontal lines. The slope of the line in such a time-space diagram represents a speed of the respective vehicle. Curved portions of the trajectories represent vehicles undergoing changes in speed including acceleration and deceleration. FIG. 3 illustrates an example embodiment of such a time-space diagram with different vehicles represented by the different lines of the diagram including a first vehicle 120, a second vehicle 125, and a third vehicle 130. The spacing between vehicles in distance is shown by the arrow 150 as a delta along the vertical (distance) axis, while the time between vehicles or headway is shown by arrow 140 as a delta along the horizontal (time) axis.

According to embodiments described herein, a TSD is developed for individual lanes. Lanes can be established through a number of methods, such as lane-level clustering of probe data points. Using any of a variety of methods to establish lanes of a roadway and a toll plaza along the roadway, the TSD can be plotted for each lane. FIG. 4 illustrates an example embodiment of such a TSD plot for a lane. As shown, time is along the X-axis, with distance along the road link lane along the Y-axis. Each line is from a probe apparatus having traversed the road link, with the slope of the plotted lines reflecting the speed, with a faster speed corresponding to a more-vertical line. In the illustrated embodiment of FIG. 4, all probe apparatuses (representing vehicles) are traveling at a normal speed. Slowed traffic would be depicted as having a slope with a greater angle from vertical.

The lane detection methods are used to establish a current lane of a vehicle traveling along a road segment. When the vehicle is approaching a toll plaza (e.g., 200 meters away), the toll plaza lane level congestion algorithm described herein can be employed. Vehicles in general are of increasing levels of technology. With the ever-increasing presence of autonomous vehicles and vehicles having a relatively high degree of autonomy, sensor data is becoming more widely available by the day. Sensor data can be obtained from one or more vehicles approaching the toll plaza. While in some embodiments, a vehicle approaching the toll plaza is performing the methods described herein to obtain lane-level congestion information for its own use (e.g., as navigational assistance or for at least semi-autonomous guidance), sensor data may be obtained from other vehicles to facilitate embodiments of the present disclosure.

Sensor data such as image data is obtained from one or more sensors of one or more vehicles approaching the toll plaza. Images are captured at relatively high refresh rates in many vehicles, particularly in vehicles with at least some degree of autonomy, as the image data is used to help guide the respective vehicle. The images may be captured at, for example, one image per second or at a faster rate. These images are used to determine a number of active toll lanes in the toll plaza along the direction of travel of the vehicle(s) carrying the sensor(s).

To determine the number of active toll lanes, a computer vision model or convolutional neural network may be employed to read through the live images coming from a sensor and determine a number of active toll lanes. The computer vision model of an example embodiment is trained on images that are either labeled or machine learning generated training images to distinguish between an open toll lane and a closed toll lane. Further, embodiments of the computer vision model can discern restrictions on active toll lanes. Toll lane signage changes between jurisdictions, between different toll operators, and between different toll plazas of different eras. However, there are often some commonalities that help guide a computer vision model as described herein. A green arrow pointing down to a lane generally is interpreted as an active toll lane, while a red "X" above a toll lane represents an inactive toll lane. Other methods of signaling active versus inactive toll lanes are possible, such that the computer vision model described herein is trained on a variety of toll lane images to be able to discern an active toll lane from an inactive toll lane.

Other signage at a toll plaza and specifically at individual toll lanes can include restrictions for a toll lane. Restrictions such as "no trailers", "two-axles only", "no vehicles over 8-foot, 6-inches", "no hazardous materials", "cash", "credit card", "EZPass® only", etc. Computer vision models as described herein can identify toll lane restrictions through recognition based on the trained model. As these toll plazas are intended to convey information to drivers in a rapid manner and be easily understood by a driver, even one who is unfamiliar with a particular toll plaza, the signage at a toll plaza is a good candidate for identification through computer vision models described herein.

The computer vision model or convolutional neural network is trained on previously captured images of toll plazas and toll booths with a wide variety of toll booth signage and indicators regarding toll lane restrictions and toll lane activity (active vs. inactive). These previously captured images may be manually labeled in some circumstances to identify elements of the images (e.g., arrows indicating an active toll lane, sign restricting payment method, etc.). Optionally, a machine learning model can process images to generate training data for the computer vision model such that training data can be automatically generated thereby increasing the amount of available training data while reducing manual interaction required.

The number of active toll lanes and restrictions thereon cannot be obtained from map information since map information is not refreshed at a rate fast enough to capture the opening and closing of toll lanes and changing restrictions (e.g., changing from cash-accepting to a pass-only lane during high-volume traffic). Thus, embodiments described herein provide a method of establishing active toll lanes to facilitate navigation through the toll plaza.

A sensor, such as an image sensor or camera of a vehicle approaching a toll plaza captures images of the toll plaza and toll booths associated with each respective toll lane. Using the computer vision model, embodiments process the captured images to determine the active lanes of the toll plaza and to identify any restrictions associated with any of the toll lanes. The toll lanes of an example embodiment are numbered, such as from a first lane on a first side (e.g., the right side). With an understanding of the present lane of the vehicle approaching the toll plaza as established from lane detection described above, the vehicle position relative to the active toll lanes of the toll plaza is established. Sensor data is optionally used to establish a width of the road as it approaches the toll plaza, and a width of each lane is estimated at around twelve feet wide. Probe data for vehicles approaching the toll plaza can be obtained from a service provider (e.g., a map services provider or a vehicle manufacturer). Based on the width of the road, the division of the width into lanes, with the probe data, the live probe data for each lane approaching the toll plaza can be established. A TSD can then be plotted for each lane as shown in FIG. 3.

Embodiments provided herein employ a second model, such as a second computer vision model or convolutional neural network, to read the TSDs and determine an active toll lane with minimum or at least a lesser amount of congestion. This second model is, in certain embodiments, trained on TSD images with varying levels of congestion such that it is able to rapidly identify congestion levels in real time based on the TSD of a toll plaza described herein. Based on the levels of congestion of the active toll lanes, a preferred active toll lane is identified. Navigational instruction or at least semi-autonomous vehicle control can be used to indicate to a driver/occupant the preferred active toll lane, and the vehicle may proceed to the preferred toll lane.

According to some embodiments, not all available toll lanes may be accessible to a vehicle. For example, if a vehicle is traveling in a left-most lane of travel approaching a toll plaza having five or more toll lanes, a right-most toll lane may not be accessible to the vehicle in a safe manner. Thus, while the right-most toll lane may have the least congestion, it may not be the preferred lane for the vehicle. A preferred lane may thus be a lane that has a relatively lower level of congestion, but is accessible to a vehicle. Accessibility may be established based on a distance to the toll plaza and a number of lanes that need to be crossed to reach a lane. Thus, as a vehicle gets closer to a toll plaza, fewer lanes may be deemed accessible. A number of lanes that a vehicle may safely cross may be proportional to a distance from the toll plaza. In some embodiments, for every 100 meters before a toll plaza, a vehicle may safely cross two lanes, for example. Further, accessibility may be affected by a traffic volume. Heavier volumes of traffic may reduce the accessibility of lanes as lane changes may become more difficult. In such an embodiment, for every 100 meters before a toll plaza, a vehicle may safely cross one lane, for example.

An output of embodiments described herein can include an expected wait time in each active toll lane of a toll plaza. FIG. 5 illustrates lanes (212-220) and toll booths 210 of a toll plaza. As shown, the active and inactive lanes are depicted, with lane 214 and lane 220 both inactive or "closed". The wait times reflecting the congestion at each active lane is also shown. The wait time at lane 218 is shown as one minute, the wait time at lane 216 is two minutes, and the wait time at lane 212 is thirty seconds. According to some embodiments, a graphical depiction of the toll plaza with the predicted wait times as shown in FIG. 5 may be presented via user interface (e.g., navigation system display) to a driver/occupant of a vehicle. While lane 212 is the preferred lane through the toll booths 210 of the toll plaza, if a vehicle is traveling in lane 220, lane 212 may not be accessible, such that lane 218 would become the preferred active toll lane with a lowest wait time of the accessible lanes.

FIGS. 6 and 7, described below, are flowcharts illustrative of methods according to example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 6 illustrates a method for identifying a most efficient path through a toll plaza accessible to a vehicle. As shown a present lane of travel is determined at 310. This is determined, for example, by sensors 21 of the apparatus 20 of FIG. 1 using processor 24 and conventional lane-level detection methods described herein. Images of the toll plaza are captured at 320, and may be captured by sensors 21 of the apparatus 20. The images are provided to a computer vision model to determine the number of lanes through the toll plaza at 330. This may be performed locally at the vehicle (e.g., by apparatus 20) or by a service provider, for example. A road geometry and relative position within the road geometry is determined at 340. A time-space diagram (TSD) is plotted for each lane of the toll plaza based on probe data of vehicles approaching the toll plaza at 350. This may be performed locally on the apparatus 20 with the probe data provided to the apparatus (e.g., via communications interface 22) or performed at a service provider (e.g., map data service provider 108) using probe data at the provider. The TSD of the illustrated embodiment is provided to another computer vision model to determine congestion on a per-lane basis at 360. Once the congestion is established for the active toll lanes, instruction or guidance to a preferred lane through the toll plaza is provided at 370. This may include at least semi-autonomous vehicle control for vehicles with some degree of autonomy, or may involve navigational instructions provided to a driver, for example.

FIG. 7 illustrates another method for determining lane-level toll plaza congestion, and more particularly, to a method, apparatus and computer program product for analyzing traffic congestion at a toll plaza and identifying a preferred lane of travel through the toll plaza based on the traffic congestion. As illustrated, a number of active toll lanes of all toll lanes of a toll plaza are determined at 410. This is performed, in some embodiments, using a computer vision model to identify from captured images which toll lanes of a toll plaza are open and in some cases, which toll lanes have restrictions. Toll lane activity is dynamic and not suited for maintaining in map data as the opening and closing of toll lanes, along with restriction changes, can be changed more frequently than map data is updated. Thus, map data generally does not keep up with toll plaza dynamics. Probe data for each active toll lane at the toll plaza is obtained at 420 to provide real time indications of traffic within the toll plaza. Lane-wise congestion for each active toll lane at the toll plaza is determined at 430 through lane-matching of the probe data within the toll plaza. A preferred lane of the active toll lanes is identified at 440, and at least one of navigational instruction or at least semi-autonomous vehicle control is provided for at 450 to enter or continue in a preferred lane through the toll plaza.

In an example embodiment, an apparatus for performing the method of FIGS. 6 and/or 7 above may comprise a processor (e.g., the processor 24) configured to perform some or each of the operations (310-370 and/or 410-450) described above. The processor may, for example, be configured to perform the operations (310-370 and/or 410-450) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-370 and/or 410-450 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   determine active toll lanes of all toll lanes at a toll plaza;
   obtain probe data for each active toll lane at the toll plaza;
   based on the obtained probe data, determine lane-wise congestion for each active toll lane at the toll plaza as a function of trajectories of vehicles in motion and stationary vehicles in each active toll lane at the toll plaza, wherein the trajectories of the vehicles in motion and the stationary vehicles in each active toll lane at the toll plaza correspond to a Time Space Diagram (TSD);
   based on the determined lane-wise congestion for each active toll lane at the toll plaza, identify a preferred lane of the active toll lanes; and
   provide for at least one of a navigational instruction or at least semi-autonomous vehicle control to enter or continue in the preferred lane.

2. The apparatus of claim 1, wherein the preferred lane comprises a lane that is both an accessible lane and a lane that has relatively lower congestion than other lanes of the active toll lanes.

3. The apparatus of claim 2, wherein an accessible lane comprises a lane that can be safely reached from a current lane of a vehicle based on a distance of the accessible lane from the current lane and a distance between a current location of the vehicle and a toll booth of the toll plaza.

4. The apparatus of claim 1, wherein causing the apparatus to determine lane-wise congestion for each active toll lane at the toll plaza comprises causing the apparatus to:
   plot the Time Space Diagram (TSD) for each active toll lane; and
   determine lane-wise congestion for each active toll lane based on the TSD.

5. The apparatus of claim 4, wherein causing the apparatus to identify a preferred lane of the active toll lanes comprises causing the apparatus to:
   process the TSD for each active toll lane through a convolutional neural network; and
   obtain, from the convolutional neural network, an indication of an active toll lane with the lowest level of congestion.

6. The apparatus of claim 4, wherein causing the apparatus to identify a preferred lane of the active toll lanes comprises causing the apparatus to:
   process the TSD for each active toll lane through a convolutional neural network; and
   obtain, from the convolutional neural network, a ranking of the active toll lanes based on a degree of congestion in each active toll lane.

7. The apparatus of claim 6, wherein causing the apparatus to identify a preferred lane of the active toll lanes comprises causing the apparatus to:
   identify the preferred lane based on a lowest degree of congestion of active toll lanes accessible from a current lane of travel of a vehicle.

8. The apparatus of claim 7, wherein a lane is determined to be accessible from a current lane of travel based on a distance of the active toll lane from the current lane of travel and a distance between a current location of the vehicle and a toll booth of the toll plaza.

9. The apparatus of claim 1, wherein the apparatus is further caused to:
   identify restrictions for each of the active toll lanes; and
   identify a preferred lane of the active toll lanes based, at least in part, on restrictions of the preferred lane.

10. A computer program product comprising at least one non-transitory computer-readable storage medium having computer-executable program code instructions stored therein, the computer-executable program code instructions comprising program code instructions to:
    determine active toll lanes of all toll lanes at a toll plaza;
    obtain probe data for each active toll lane at the toll plaza;
    based on the obtained probe data, determine lane-wise congestion for each active toll lane at the toll plaza as a function of trajectories of vehicles in motion and stationary vehicles in each active toll lane at the toll plaza, wherein the trajectories of the vehicles in motion and the stationary vehicles in each active toll lane at the toll plaza correspond to a Time Space Diagram (TSD);
    based on the determined lane-wise congestion for each active toll lane at the toll plaza, identify a preferred lane of the active toll lanes; and
    provide for at least one of a navigational instruction or at least semi-autonomous vehicle control to enter or continue in the preferred lane.

11. The computer program product of claim 10, wherein the preferred lane comprises a lane that is both an accessible lane and a lane that has relatively lower congestion than other lanes of the active toll lanes.

12. The computer program product of claim 11, wherein an accessible lane comprises a lane that can be safely reached from a current lane of a vehicle based on a distance of the accessible lane from the current lane and a distance between a current location of the vehicle and a toll booth of the toll plaza.

13. The computer program product of claim 10, wherein the program code instructions to determine lane-wise congestion for each active toll lane at the toll plaza comprise program code instructions to:
  plot the Time Space Diagram (TSD) for each active toll lane; and
  determine lane-wise congestion for each active toll lane based on the TSD.

14. The computer program product of claim 13, wherein the program code instructions to identify a preferred lane of the active toll lanes comprise program code instructions to:
  process the TSD for each active toll lane through a convolutional neural network; and
  obtain, from the convolutional neural network, an indication of an active toll lane with the lowest level of congestion.

15. The computer program product of claim 13, wherein the program code instructions to identify a preferred lane of the active toll lanes comprise program code instructions to:
  process the TSD for each active toll lane through a convolutional neural network; and
  obtain, from the convolutional neural network, a ranking of the active toll lanes based on a degree of congestion in each active toll lane.

16. The computer program product of claim 15, wherein the program code instructions to identify a preferred lane of the active toll lanes comprise program code instructions to:
  identify the preferred lane based on a lowest degree of congestion of active toll lanes accessible from a current lane of travel of a vehicle.

17. The computer program product of claim 16, wherein a lane is determined to be accessible from a current lane of travel based on a distance of the active toll lane from the current lane of travel and a distance between a current location of the vehicle and a toll booth of the toll plaza.

18. The computer program product of claim 10, further comprising program code instructions to:
  identify restrictions for each of the active toll lanes; and
  identify a preferred lane of the active toll lanes based, at least in part, on restrictions of the preferred lane.

19. A method comprising:
  determining active toll lanes of all toll lanes at a toll plaza;
  obtaining probe data for each active toll lane at the toll plaza;
  based on the obtained probe data, determining lane-wise congestion for each active toll lane at the toll plaza as a function of trajectories of vehicles in motion and stationary vehicles in each active toll lane at the toll plaza, wherein the trajectories of the vehicles in motion and the stationary vehicles in each active toll lane at the toll plaza correspond to a Time Space Diagram (TSD);
  based on the determined lane-wise congestion for each active toll lane at the toll plaza, identifying a preferred lane of the active toll lanes; and
  providing for at least one of a navigational instruction or at least semi-autonomous vehicle control to enter or continue in the preferred lane.

20. The method of claim 19, wherein the preferred lane comprises a lane that is both an accessible lane and a lane that has relatively lower congestion than other lanes of the active toll lanes.

* * * * *